United States Patent
Ching et al.

(10) Patent No.: US 9,378,448 B2
(45) Date of Patent: Jun. 28, 2016

(54) RFID SENSOR TAG AND SYSTEM FOR SMALL OUTPUT TRANSDUCERS, AND RELATED METHODS

(71) Applicant: Lokring Technology, LLC, Willoughby, OH (US)

(72) Inventors: Larry Ching, Boulder, CO (US); Joseph Michael Lektomiller, Thornton, CO (US)

(73) Assignee: LENLOK HOLDINGS, LLC, Willoughby, OH (US)

( * ) Notice: Subject to any disclaimer, the term of this patent is extended or adjusted under 35 U.S.C. 154(b) by 0 days.

(21) Appl. No.: 14/485,729

(22) Filed: Sep. 14, 2014

(65) Prior Publication Data

US 2015/0083810 A1 Mar. 26, 2015

Related U.S. Application Data

(60) Provisional application No. 61/880,978, filed on Sep. 22, 2013.

(51) Int. Cl.
*G06K 19/07* (2006.01)
(52) U.S. Cl.
CPC ........ *G06K 19/0715* (2013.01); *G06K 19/0716* (2013.01)
(58) Field of Classification Search
CPC .................. G06K 19/0715; G06K 19/0716
See application file for complete search history.

(56) References Cited

U.S. PATENT DOCUMENTS

| | | | | |
|---|---|---|---|---|
| 6,607,136 | B1* | 8/2003 | Atsmon et al. | 235/492 |
| 2006/0202821 | A1* | 9/2006 | Cohen | G01K 1/024 340/539.27 |
| 2006/0250245 | A1* | 11/2006 | Forster | G01R 31/312 340/572.1 |
| 2007/0276201 | A1* | 11/2007 | Lee | A61B 5/0031 600/301 |
| 2008/0252459 | A1* | 10/2008 | Butler et al. | 340/572.1 |
| 2011/0181399 | A1* | 7/2011 | Pollack et al. | 340/10.33 |
| 2011/0287713 | A1* | 11/2011 | Ali | H04B 5/0037 455/41.1 |
| 2014/0000386 | A1* | 1/2014 | Malhan | G01L 3/108 73/862.338 |

* cited by examiner

*Primary Examiner* — Sonji Johnson
(74) *Attorney, Agent, or Firm* — Pearne & Gordon LLP

(57) ABSTRACT

A battery-free wireless sensor system enables high resolution and very accurate measurements of strain or other transducers with small signal outputs. The system may comprise a sensor tag, associated readers and data processing. The sensor tag may be based on passive RFID, or other passive devices that are powered by RF energy and that communicate with the powering source by backscatter, inductive coupling or reflected energy. The system may include a reader that powers the sensor tags with RF energy and that also wirelessly reads data from and writes data to the sensor tag. The reader software or host software may perform operations on the data that enable more accurate and useable information from the sensor tag. The invention may also include methods for data processes that improve the functionality and performance of the sensor system.

8 Claims, 1 Drawing Sheet

RFID SENSOR TAG AND SYSTEM FOR SMALL OUTPUT TRANSDUCERS, AND RELATED METHODS

CROSS-REFERENCE(S) TO RELATED APPLICATIONS

This is a nonprovisional filing of U.S. 61/880,978 filed 22 Sep. 2013 by Ching and Lektomiller.

TECHNICAL FIELD

The disclosure relates to RFID (radio frequency identification) sensor tags.

BACKGROUND

It is important for health monitoring of many types of structures, for example bridges, ships, aircraft, oil rigs, oil storage tanks, buildings and the like to have a permanently mounted strain monitoring sensor device that is read by an associated data collection system. Due to the locations where strain measurement is useful (buried foundations, under water, inside tanks, etc.) once installed, the strain monitoring devices are often difficult to access for reading or for maintenance. Therefore, it is very useful to be able to communicate with the installed sensor device wirelessly. Further, it is very useful to eliminate the battery from the sensor device, which requires maintenance, either replacement of the battery or the replacement of the entire sensor for fully encapsulated devices.

Strain transducers for metallic structures are typically metal film resistance devices, for example, Micro Measurements strain transducer, P/N N2K-06-55020Q. Pressure transducers for measuring gas and liquid pressure are often constructed of a strain transducer attached to a metal diaphragm that bends (strains) as a result of applied pressure. These transducers typically produce a small electrical resistance change in response to the movement (strain) of the structure to which they are attached, which is often metal. The movements are small, on the order of 0.001% to 0.01%, and the resistance changes are also very small. Typical systems using these transducers have circuitry with very stable power supplies, such as batteries with added voltage regulation, and high performance microprocessors with sophisticated sensor conditioning and high resolution analog-to-digital capability.

In prior art battery-free, RFID-powered sensor tags, transducers are typically attached to the voltage output and the analog-to-digital inputs directly available on the RFID ICs. An example of an RFID IC with sensor inputs is the IDS SL900A RFID IC. The outputs and inputs available on this or other available RFID ICs do not provide the capability to drive stable bias voltages or currents into the transducer or to detect the small resistance change with adequate resolution to produce an accurate reading. Further, the RF energy beamed at the sensor tag by the RFID reader induces current and voltages on the circuit traces and components of the sensor tag which create unwanted signals (electrical noise) which makes it even more difficult to detect the small signal changes of the strain transducer.

SUMMARY

It is a general object of the invention to provide improved techniques for implementing and operating RFID sensor tags.

According to the invention, generally, a battery-free wireless sensor system enables high resolution and very accurate measurements of strain or other transducers with small signal outputs. The system may comprise a sensor tag, associated readers and data processing. The sensor tag may be based on passive RFID, or other passive devices that are powered by RF energy and that communicate with the powering source by backscatter, inductive coupling or reflected energy. The system may include a reader that powers the sensor tags with RF energy and that also wirelessly reads data from and writes data to the sensor tag. The reader software or host software may perform operations on the data that enable more accurate and useable information from the sensor tag. The invention may also include methods for data processes that improve the functionality and performance of the sensor system.

According to some embodiments (examples) of the invention, a method of creating a stable voltage input to a transducer associated with an RFID sensor tag may comprise: amplifying a very small signal from the transducer and filtering RF noise out of the desired signal. The method may further comprise providing for transducer temperature compensation. The method may further comprise performing a calibration procedure. The method may further comprise storing an initial reading and subsequent measurement history in the sensor tag. The method may further comprise at least one of: providing a stable voltage input to the transducer; amplifying a very small signal from the transducer; filtering RF noise out of the desired signal; separating the sensing element from the RFID chip; providing circuitry on the chip to isolate the sensor from RF noise; and increasing the ability to measure low voltage (micro amps) with a passive circuit According to some embodiments (examples) of the invention, an RFID sensor tag may comprise an RFID IC with sensor input, and may further comprise one or more of: a precision voltage reference; an RF filter that blocks the voltages that are created by the RFID reader RF field inducing currents into the circuit traces; any resistive sensor or transducer; a very low power consumption amplifier; and an RF filter that blocks the voltages that are created by the RFID reader RF field inducing currents into the circuit traces. The RFID sensor tag may further comprise at least one of: means for providing a stable voltage input to the transducer; means for amplifying a very small signal from the transducer; means for filtering RF noise out of the desired signal; means for separating the sensing element from the RFID chip; means for providing circuitry on the chip to isolate the sensor from RF noise; and means for increasing the ability to measure low voltage (micro amps) with a passive circuit In their various embodiments, the invention(s) described herein may relate to industrial and commercial industries, such RFID applications, sensor applications, sensor tags, strain gauges, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be exaggerated, others may be omitted, for illustrative clarity. Some figures may be in the form of diagrams.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Various embodiments will be described to illustrate teachings of the invention(s), and should be construed as illustrative rather than limiting. Any dimensions and materials or processes set forth herein should be considered to be approximate and exemplary, unless otherwise indicated.

Figure 1:
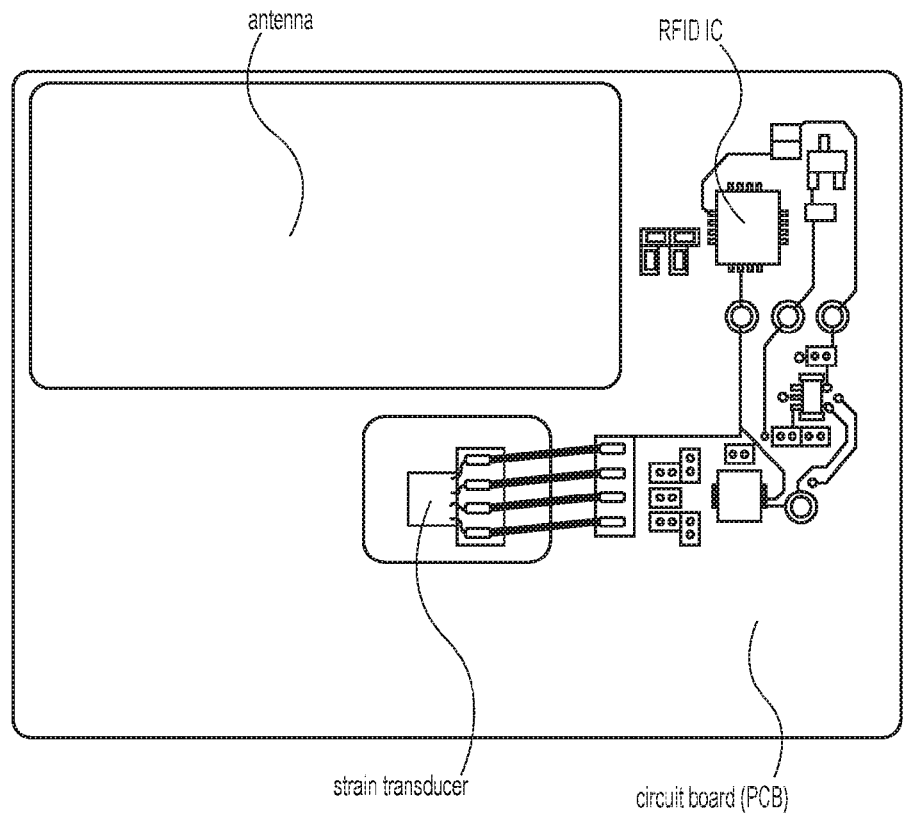

FIG. 1 is a photograph showing a circuit board for a sensor tag.

Figure 2:
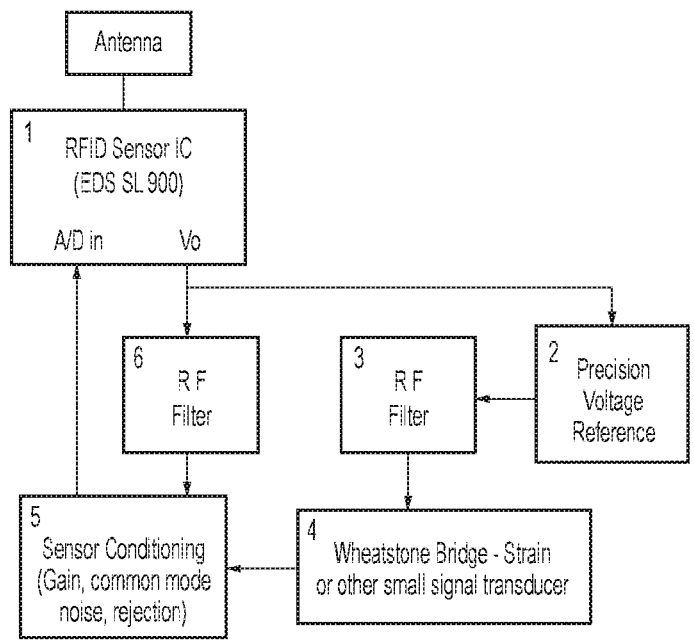

FIG. 2 is a block diagram of an exemplary embodiment of the sensor tag.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention (s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention (s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

As used herein, a "sensor" is the complete assembly required to detect and communicate a sensed event, while a "transducer" is the element within that assembly which accomplishes only the detection of the event. In the sensor industry these terms are often used interchangeably.

This invention enables accurate and high resolution transducer readings by a passive RFID sensor tag by adding novel circuitry that creates a stable voltage input to the transducer, amplifies the very small signal from the transducer and filters RF noise out of the desired signal.

A further limitation of prior art battery-free, RF powered, sensor system is very small amount of energy that can be collected from the RF energy emitted by the RFID reader. Due to limitations on RF emission levels imposed by regulations (for example the FCC), and the fact that the energy falls off as the square of the distance separating the transmitter and sensor tag, only very small amounts of power are available to the sensor tag, especially as the distance from the reader grows.

The invention enables maximum read range by combining extremely low power circuit design and an antenna specifically designed to be matched to the circuitry while being optimized for performance near metal.

Many of the structures to which strain sensors are attached are metal. One embodiment of this invention combines an advanced planar, patch antenna that allows a thin sensor tag to be directly mounted to a metal surface. The sensor tag package is designed to allow easy attachment of the sensor separately from attaching the tag package, protection of the strain transducer, and very short circuit traces to reduce coupling of electrical noise, while providing maximum read range.

In addition to being able to monitor strain, the techniques disclosed herein may be applicable to many other types of transducers such as pressure transducers, highly accurate temperature sensors such as RTDs (resistance temperature detectors), thermistors, proximity sensors, humidity sensors, light detectors (photo cells) and the like. In these embodiments the strain transducer can be replaced with the other transducer with minor changes in the circuitry and packaging.

Another common source of error in sensor readings is due to the fact that the sensors may have a temperature coefficient where the output of the transducer is not only a function of the sensed parameter, such as strain, but is also a function of temperature.

According to a feature of the invention, temperature may be measured by the sensor tag, and subsequently read by the RFID reader, and may be used for the transducer temperature compensation. This temperature measurement can be from a temperature sensor that is internal to the RFID IC or could be a separate sensor, for example a tethered sensor that is placed adjacent to the strain transducer to measure the temperature very near the transducer. Both the sensor transfer function (for example, the resistance change versus strain) and the sensor temperature coefficient can be measured during a calibration procedure.

Connecting a transducer directly to IDS (SL900A) A/D input yields very poor results due to the unstable DC output of the IDS IC when powered by an RF source, providing a voltage source to the transducer. This approach also results in poor resolution and noise rejection due to the very small voltage (10's of microvolts) change produced by the very small transducer resistance change.

Some features disclosed herein may include, but are not limited to:
providing a stable voltage input to the transducer
amplifying a very small signal from the transducer
filtering RF noise out of the desired signal
separating the sensing element from the RFID chip
providing circuitry on the chip to isolate the sensor from RF noise
increasing the ability to measure low voltage (micro amps) with a passive circuit In a typical calibration procedure the sensor device is placed in a test system where a matrix of known inputs is applied and the outputs are measured and recorded. In one embodiment, an assembled sensor tag is placed in a test chamber equipped with an RFID reader. A matrix of known temperatures and strains are applied to the devices and the related outputs are read by the RFID reader. An attached computer calculates the specific output for each input. From these outputs, the computer computes the transfer functions (i.e. equations) and temperature coefficients for each device. Calibration constants for these functions are then written into the non-volatile read-write memory of the RFID IC by the RFID reader.

Many sensor devices may be calibrated and programmed at the same time using anti-collision functionality in the RFID communication protocol. In operation, whenever a sensor tag is read, the real-time strain sensor and temperature data, along with the calibration constants that were stored in memory during the calibration process, are transmitted to the RFID reader. The software in the RFID reader, or possibly a host computer, uses these data in transfer equations to calculate the actual, temperature-compensated value of the sensed parameter.

A further feature, particularly useful for strain gages, is to be able to offset an initial reading so that only changes in the reading, i.e. strain that occurs after installation of the sensor tag, are reported. This is important because the installation of the strain sensor, which may include gluing or other attachment to the structure surface, can cause a certain amount of strain to be induced into the transducer that is not related to the movement of the structure. After installation of the sensor tag, a reading can be taken of the strain, and this initial reading can be transferred back to the sensor tag by the RFID reader and stored in the non-volatile memory of the sensor tag. This initial reading is known as a "zero-offset". Further, the zero-offset reading can be time stamped with real time and date kept by the RFID reader. The time and date can be recorded in the non-volatile memory of the sensor tag to indicate (at a subsequent reading of the sensor tag) when the sensor tag was installed. This is an important feature because the change in strain as a function of time may often be more important than an absolute reading. The sensor tag read-write feature with readings stored in the RFID memory also enables every strain reading to be time stamped and stored to create an on-board strain measurement history. This method can also be used to adjust for changes in strain that can occur if the structure is repaired or modified. Repairs can cause new strain to occur that is not related to structural degradation. After a repair, the zero-offset procedure can be conducted again and a new offset established. The time stamp feature is also useful to let the user know when repairs or modifications have been completed.

Each sensor may have a unique ID number—and the anti-collision capability afforded by most RFID protocols allows for many sensors to be "in the radio field" and read by one RFID reader. This allows for many sensors to be installed in a small area and be read simultaneously by a fixed RFID reader that is several meters away for ongoing, automated structural health monitoring.

In summary, this invention is of passive RFID or other battery-free backscatter sensor system that can provide very accurate readings of extremely small transducer signal changes while consuming very little power (to maximize read range) and while operating in a strong RFID radio field.

SOME EXEMPLARY EMBODIMENT(S)

The photograph (FIG. 1) and block diagram (FIG. 2) and descriptions thereof describe at a high level an exemplary embodiment of the sensor tag design.

FIG. 1 is a photograph showing a circuit board for the sensor tag, with the following exemplary components:

- an IDS SL900A RFID IC with sensor inputs and internal temperature sensor.
- a UHF patch antenna tuned for operation near metal
- a Micro Measurements strain transducer, P/N N2K-06-55020Q which may be protected from outside damage by package design FIG. 2 is a block diagram of an exemplary embodiment of the sensor tag. Various functional blocks are shown, as follows:

Block 1 comprises an RFID IC with sensor input. One example of such an IC is the IDS SL 900A. When the RFID IC receives power via the RFID reader RF field the RF signal is rectified by the IC to create an output voltage, Vo. This output voltage is not very stable and varies as a function of the RF energy input to the IC. This voltage, Vo, is not stable enough to bias the transducer bridge circuit without introducing measurement errors. A/D IN is the analog-to-digital converter input designed into the RFID IC. This is a low resolution, and not very sensitive A/D converter circuit.

Block 2 comprises a precision voltage reference with circuitry that creates a very stable voltage that is slightly lower than Vo. This block is designed for very low power consumption to minimize read-range reduction.

Block 3 comprises an RF filter that blocks the voltages that are created by the RFID reader RF field inducing currents into the circuit traces. This filtering minimizes measurement error that would be created by fluctuating bias voltages at the input to the transducer. This block is designed for very low power consumption to minimize read-range reduction. Blocks 2 and 3 work together to create a very stable supply voltage to the transducer.

Block 4 comprises any resistive sensor or transducer, including bridge devices; devices that create a voltage such as piezo sensors; thermocouples, microphones, thermo-electric generators, photo-electric cells, and the like; capacitive sensors; and many other sensor or transducer types. Due to the low power available from the RF source in passive sensor tags, it is best to use transducers with high impedance to lower power consumption. High impedance sensors have small signal outputs and are more susceptible to electrical noise which make the features of this invention more beneficial.

Block 5 comprises a very low power consumption amplifier to amplify the transducer voltage change to be at an acceptable level for the analog-to-digital input of the RFID IC. Due to the constraints of integrating several functions such as RFID communication, rectification to create a DC voltage supply, read/write memory, temperature sensor, and sensor inputs into a single, low cost integrated circuit, the A/D converters are typically low performance. Block 5 creates an amplified, increased dynamic range and voltage adjusted input to the A/D that enables operation in the center of the A/D range for optimal performance. This block is designed for very low power consumption to minimize read-range reduction.

Block 6 comprises an RF filter that blocks the voltages that are created by the RFID reader RF field inducing currents into the circuit traces, similar to Block 3. This filtering minimizes measurement error that would be created by fluctuating voltages within the sensor conditioning and amplification circuit of Block 5. This block is designed for very low power consumption to minimize read-range reduction.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

We claim:

1. Method of passively monitoring a strain exerted on an object, the method comprising:
   with an antenna provided to an RFID sensor tag, receiving an interrogation signal transmitted by a RFID reader;
   creating a stable supply voltage that is input to a transducer associated with the RFID sensor tag from an induced voltage created as a result of a current induced by the interrogation signal;
   with an RF filter, blocking from the supply voltage a component of voltages created by currents induced in circuit traces by a RF field generated by the RFID reader;
   with the transducer, sensing the strain and outputting a signal on the order of 10's of microvolts indicative of the strain while energized by the induced voltage;
   with an amplifier, amplifying the signal from the transducer and filtering RF noise out of the signal to produce a desired signal; and
   transmitting, from the antenna, the desired signal indicative of the strain that is received by the RFID reader.

2. The method of claim 1, further comprising:
   receiving, from a temperature sensor, a signal indicative of a temperature adjacent to a location of the RFID sensor tag, and providing for transducer temperature compensation.

3. The method of claim 2, wherein the transducer temperature compensation is performed by utilizing a calibration constant determined during a temperature calibration procedure, said method further comprising:
   transmitting the calibration constant that is received by the RFID reader using the antenna in response to said receiving the interrogation signal.

4. The method of claim 1, further comprising:
   storing an initial reading and subsequent measurement history in the RFID sensor tag.

5. The method of claim 1 further comprising filtering a component of a voltage resulting from a current induced in a circuit trace by the interrogation signal transmitted by the RFID reader to power the amplifier.

6. The method of claim 1 further comprising:
   after installation of the RFID sensor tag on the object that is monitored, sensing a preliminary strain exerted on the object; and storing the preliminary strain in a non-volatile memory provided to the RFID sensor tag, wherein said desired signal indicative of the strain transmitted from the antenna is indicative of a deviation of the strain relative to the preliminary strain stored in the non-volatile memory.

7. The method of claim 6 further comprising storing time information indicative of a time when the preliminary strain was sensed in the non-volatile memory, and transmitting the time information in response to said receiving the interrogation signal.

8. An RFID sensor tag comprising:
   an RFID IC with sensor input;
   a precision voltage reference that generates a supply voltage from an induced voltage generated by an RF field created by an RFID reader operated to interrogate the RFID IC;
   an RF filter that blocks, from the supply voltage, a component of voltages that are created by the RFID reader RF field inducing currents into circuit traces;
   a resistive transducer that outputs a strain signal on the order of 10's of microvolts indicative of strain to which an object associated with the RFID sensor tag is subjected, wherein the RF filter is disposed electrically between the precision voltage reference and the resistive transducer to supply the resistive transducer with the supply voltage;
   an amplifier arranged to generate an amplified signal by amplifying the strain signal emitted by the resistive transducer; and
   a second RF filter that blocks voltages that are created by the RFID reader RF field inducing currents into the circuit traces from a signal powering the consumption amplifier.

* * * * *